United States Patent
Park et al.

(10) Patent No.: US 9,252,429 B2
(45) Date of Patent: Feb. 2, 2016

(54) ELECTRODE ADDITIVES COATED WITH ELECTRO CONDUCTIVE MATERIAL AND LITHIUM SECONDARY COMPRISING THE SAME

(75) Inventors: Hong-Kyu Park, Daejeon (KR); Kwang Hoon Kim, Seoul (KR); Sun kyu Kim, Seongnam-si (KR); Seung Il Yoo, Gumi-si (KR); Jae-Up Jang, Daejeon (KR); Yong Hoon Kwon, Seongnam-si (KR); Kyungmin Chun, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/473,415

(22) Filed: May 16, 2012

(65) Prior Publication Data

US 2012/0288761 A1    Nov. 15, 2012

Related U.S. Application Data

(63) Continuation of application No. 11/050,973, filed on Feb. 4, 2005, now abandoned.

(30) Foreign Application Priority Data

Jul. 2, 2004  (KR) .................. 10-2004-0008135

(51) Int. Cl.
*H01M 4/62* (2006.01)
*H01M 4/13* (2010.01)
(Continued)

(52) U.S. Cl.
CPC ............. *H01M 4/624* (2013.01); *H01M 4/13* (2013.01); *H01M 4/62* (2013.01); *H01M 4/626* (2013.01); *H01M 10/0525* (2013.01); *Y02E 60/122* (2013.01)

(58) Field of Classification Search
CPC ......... H01M 4/13; H01M 4/62; H01M 4/626; H01M 4/624; H01M 10/0525
USPC ............................ 429/212, 232, 218.1, 231.8
See application file for complete search history.

(56) References Cited

U.S. PATENT DOCUMENTS

| | | |
|---|---|---|
| 4,450,214 A | 5/1984 | Davis |
| 5,707,460 A | 1/1998 | Chaterjee |
| 5,721,065 A | 2/1998 | Collien et al. |

(Continued)

FOREIGN PATENT DOCUMENTS

| | | |
|---|---|---|
| EP | 0621236 A1 | 10/1994 |
| EP | 0880186 A1 | 11/1998 |

(Continued)

OTHER PUBLICATIONS

Primak W., C-Axis Electrical Conductivity of Graphite, Feb. 3, 1956, Physical Review, vol. 103 No. 3.*

(Continued)

*Primary Examiner* — Kenneth Douyette
(74) *Attorney, Agent, or Firm* — Lerner, David, Littenberg, Krumholz & Mentlik, LLP

(57) ABSTRACT

Provided are an electrode additive coated with a coating material made of electrically conductive materials such as metal hydroxides, metal oxides or metal carbonates, and an electrode and a lithium secondary battery comprising the same. The electrode additive in accordance with the present invention can improve high temperature storage characteristics of the battery, without deterioration of performance thereof.

11 Claims, 3 Drawing Sheets

(51) Int. Cl.
*H01M 4/58* (2010.01)
*H01M 10/0525* (2010.01)

(56) References Cited

U.S. PATENT DOCUMENTS

| | | | |
|---|---|---|---|
| 6,514,640 | B1 | 2/2003 | Armand et al. |
| 2002/0168574 | A1 | 11/2002 | Ahn et al. |
| 2003/0049541 | A1* | 3/2003 | Inagaki et al. ............... 429/332 |
| 2003/0129494 | A1* | 7/2003 | Kaneda et al. ............ 429/231.1 |
| 2003/0162100 | A1 | 8/2003 | Takahashi et al. |
| 2004/0029014 | A1 | 2/2004 | Hwang et al. |

FOREIGN PATENT DOCUMENTS

| | | | | |
|---|---|---|---|---|
| JP | 56130080 | A * | 10/1981 | ............ H01M 4/62 |
| JP | 1995-192721 | | 7/1995 | |
| JP | 09022733 | A | 1/1997 | |
| JP | 10-255839 | | 9/1998 | |
| JP | 10255389 | A | 9/1998 | |
| JP | 11-149943 | | 6/1999 | |
| JP | 2001-110454 | A | 4/2001 | |
| JP | 2001-118567 | A | 4/2001 | |
| JP | 2002-050358 | A | 2/2002 | |
| JP | 2003086174 | A | 3/2003 | |
| KR | 20010035700 | A | 5/2001 | |
| KR | 20030057321 | | 7/2003 | |

OTHER PUBLICATIONS

Machine translation of JP 2002-050358, Okuda et al., Feb. 15, 2002.*
English Translation of: JP 56130080A, Momose et al., Oct. 12, 1981.*

* cited by examiner

ELECTRODE ADDITIVES COATED WITH ELECTRO CONDUCTIVE MATERIAL AND LITHIUM SECONDARY COMPRISING THE SAME

CROSS REFERENCE TO RELATED APPLICATION

This application is a continuation of U.S. application Ser. No. 11/050,973, filed on Feb. 4, 2005, which claims priority to Korean Patent Application No. 10-2004-0008135, filed on Feb. 7, 2004, and all the benefits accruing therefrom under 35 U.S.C. 119, the content of which is herein incorporated by reference in its entirety.

FIELD OF THE INVENTION

The present invention relates to an electrode additive that is capable of improving battery performance and high temperature storage characteristics when it is added to an electrode of a lithium secondary battery, and an electrode and lithium secondary battery comprising the same.

BACKGROUND OF THE INVENTION

In order to keep pace with the continuing trend towards portabilization, miniaturization, and higher functionalization of a variety of electronic devices and instruments with development of the Information-Electronic Industry, higher capacity, smaller and lighter lithium secondary batteries are increasingly in demand. Recently, with diversification of functions of the electronic devices and instruments, there is also a strong need for realization of higher capacity, functionality, and performance of lithium secondary batteries, as a main power source. In addition, as the temperature range of lithium secondary batteries in use is also further extended, environmental conditions to which batteries are applied become more severe such that maintenance of initial performance without degradation in battery performance even when being maintained at higher temperatures of more than 80° C. for a prolonged period of time is required.

However, when material such as $LiCoO_2$, $LiMn_2O_4$ or the like is used as a cathode active material for the lithium secondary battery, reaction between electrolyte and electrode surface leads to poor high-temperature characteristics, such as swelling and bulking in storage at a higher temperature of more than 80° C. Additionally, when charge/discharge cycles are repeatedly performed at the higher temperature, the electrochemical reaction continuously occurring at a cathode or anode surface contributes to production of decomposed byproducts of the electrolyte and gas in the battery, thereby severely swelling the battery.

A variety of study and research has been made to solve those problems. Korean Patent Laid-open Publication No. 2003-0057321 discloses a technique of forming a protective coating film using electrolyte additives such as vinylene carbonate, alkenylethylene carbonate and the like, wherein the electrolyte additives are used to inhibit electrolyte decomposition reaction of the cathode at higher temperatures, such that these additives are first decomposed at cathode potential, thereby forming the protective film. However, although such additives may effectively inhibit battery swelling at higher temperatures, the additives may result in reduction of battery capacity or deterioration of battery life characteristics. For these reasons, various kinds of additives should be utilized to improve one functionality of the battery, when such electrolyte additives are used.

In addition, Korean Patent Laid-open Publication No. 2001-35700 and Japanese Patent Laid-Open Publication No. 1998-255389 disclose techniques of improving battery life characteristics and high temperature storage characteristics by addition of metal oxides or metal hydroxides to an electrode (cathode). However, metal oxides or metal hydroxides are electrically non-conductive and thus, when they are used as additives, interfere with electrical flow in the electrodes, thereby resulting in decreased high rate discharge characteristics of the battery, as well as increased resistance thereof leading to lowering of battery life characteristics.

Japanese Patent Laid-Open Publication Nos. 2003-86174 and 1997-22733 disclose a method of coating the cathode active material with an electro-conductive material such as conductive material using a mechanofusion apparatus and a binder. However, due to integration between the cathode active material and the conductive material in this method, it may be possible to improve battery capacity or diminish electrical resistance, thereby improving high rate discharge characteristics, but the conductive material coated on the surface of the cathode active material rather hampers migration of lithium ions, resulting in deterioration of battery performance.

Therefore, there is a strong need for an electrode additive that facilitates excellent high temperature storage performance of the lithium secondary battery and simultaneously does not inhibit high rate discharge and other battery performance characteristics.

SUMMARY OF THE INVENTION

Therefore, the present invention has been made to solve the above problems, and other technical problems that have yet to be resolved.

The present inventors have surprisingly found that battery performance and high temperature storage characteristics can be improved by preparing an electrode additive having core particles such as metal hydroxides, metal oxides or metal carbonates coated with electro-conductive material and adding the electrode additive to a cathode and/or anode of a lithium secondary battery.

On the basis of this finding, it is an object of the present invention to provide an electrode additive that is capable of improving battery performance and high temperature storage characteristics, and an electrode for a lithium secondary battery and lithium secondary battery comprising the same.

In accordance with an aspect of the present invention, the above and other objects can be accomplished by the provision of an electrode additive for a secondary battery electrode in which electro-conductive material is coated on the surface of a material that is added to the electrode material so as to improve battery characteristics.

As used herein, the term "electrode additive" refers to materials that are added to electrodes for various purposes such as improving high temperature characteristics and charge/discharge cycle characteristics of the battery. Since, among those materials, there are various kinds of low conductivity materials, as described above, such materials generally interfere with electron migration due to their high resistivity, when added to electrodes, and thereby lower battery performance. In accordance with the present invention, there is provided an electrode additive that can exert original effects without causing deterioration of battery performance, by coating the surface of the electrode additive with electro-conductive materials.

In accordance with the present invention, additive material (hereinafter, referred to as "core particle"), which is coated with electro-conductive materials, is added to electrodes for improvement of high temperature storage characteristics, and is exemplified as compounds represented by Formula 1 below:

$$M_xA_y$$ Formula 1 wherein, M is a metal, A is selected from the group consisting of OH, O and $CO_3$, and x represents the valence of M and y represents the oxidation number of A.

Metal hydroxides, metal oxides, and metal carbonates of Formula 1 may be used alone or in any combination thereof.

Electro-conductive materials (hereinafter, referred to as "coating materials"), which are coated on core particles, are not particularly limited, so long as they exhibit excellent conductivity without causing chemical changes in the battery of interest. For example, there may be preferably used at least one selected from the group consisting of carbon that has been used as conductive material for a conventional lithium secondary battery, electro-conductive materials, electro-conductive metals, electro-conductive inorganic materials and electro-conductive polymers.

In accordance with another aspect of the present invention, there are provided an electrode fabricated by preparing an electrode slurry using electrode material containing the electrode additive and electrode active material and then applying the thus-prepared electrode slurry to a current collector, and a lithium secondary battery comprising the same.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Figure 1:
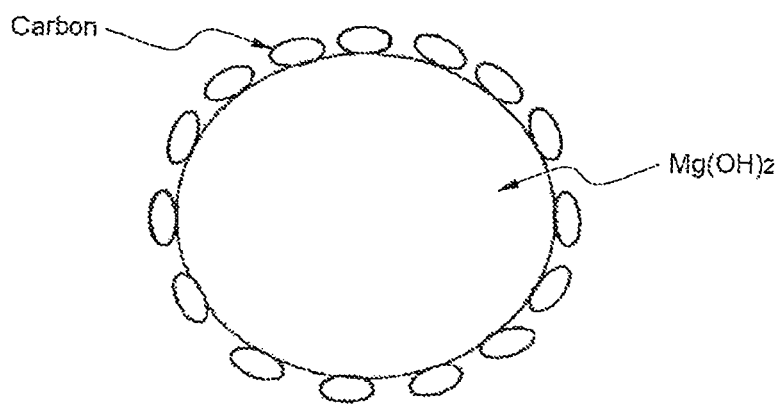
FIG. 1 schematically shows a cross-sectional view of an electrode additive in accordance with the present invention.

Now, the present invention will be described in more detail.

In accordance with the present invention, by addition of an electrode additive to a cathode and/or anode of a battery, it is possible to inhibit battery swelling due to formation of decomposition by-products or gas production even when the battery is stored at high temperatures for a prolonged period of time, and also to improve battery performance such as life characteristics and charge/discharge rate at room temperature.

Conventionally, materials such as metal hydroxides, metal oxides and metal carbonate were used per se as cathode additives, but these materials are coated on the surface of the cathode active material and then impede migration of cathode active material and electrons, thereby deteriorating high rate discharge characteristics of the battery. In the present invention, via use of core particles, such as metal hydroxides, metal oxides or metal carbonates, coated with the coating material, it was possible to solve the problem associated with lowering of high rate discharge characteristics.

In accordance with the present invention, the coating material preferably has high electronic conductivity and small particle size to the maximum extent possible. Where electronic conductivity is lower, this may disadvantageously result in increase of electrode resistance thereby degrading battery performance. In addition, where the particle size of the coating material is too large, it may be difficult to coat the surface of core particles. On the other hand, the smaller the particle size of the coating material the denser and more uniform the coating on the core particles.

In the present invention, electrical conductivity of the coating material is preferably more than $2.0\times10^2/cm\Omega$ and the particle size thereof is preferably within the range of 10 to 1000 nm.

There is no particular limit to kinds of carbon, electro-conductive metals, electro-conductive inorganic materials and electro-conductive polymers, as described above as being preferred examples of the coat materials. Preferably, for example, carbon may be selected from the group consisting of carbon black, acetylene black and Super-P. Electro-conductive metals may be selected from the group consisting of Cu, Ag, Pt and Ni. Electro-conductive inorganic materials may be selected from the group consisting of indium tin oxide ($In_2O_3 SnO_2$), tin oxide ($SnO_2$), zinc oxide (ZnO), ruthenium oxide ($RuO_2$) and $TiB_2$. Electro-conductive polymers may be selected from the group consisting of polypyrrole and polyaniline. Among the above-mentioned coating materials, acetylene black preferably has a particle size of 100 nm and electrical conductivity of more than $6.1\times10^2/cm\Omega$. Ni preferably has a particle size of 1000 nm and electrical conductivity of more than $9.17\times10^4/cm\Omega$. Polypyrrole preferably has a particle size of 200 nm and electrical conductivity of more than $2.0\times10^2/cm\Omega$.

There is no particular limit to kinds of metal elements (M), which are contained in metal hydroxides, metal oxides or metal carbonates, those being described as preferred examples of the core particles. For example, metals may be preferably selected from the group consisting of Al, B, Mg, K, Be, Ca, Sr, Ba, Na, Cr, Sn, Ga, Bi, Ni, Co, Fe, Cr, Y and Zr. More preferably, metals may be selected from the group consisting of Al, B, Mg, Ba, Y and Zr.

A process for preparing an electrode additive in accordance with the present invention will be exemplified as follows.

Core particles to be coated are mixed with the coating material to prepare a mixture. In preparing the mixture, the amount of the coating material is preferably within the range of 0.01 to 20% by weight, relative to that of the core particles. Where the amount of the coating material exceeds the above-mentioned range, the resulting coating layer is too thick. On the other hand, where the amount of the coating material is less than the above range, core particles may be incompletely and partially coated.

Next, the mixture thus obtained was fused using a mechanofusion apparatus, for example, so as to coat core particles with the coating material. During such a fusion process, rotation speed and treatment time of the mechanofusion apparatus can be controlled as desired. Preferably, the rotation speed of the mechanofusion apparatus is between 1500 and 3000 rpm, and treatment time is in the range of 0.1 to 10 hours.

Figure 2:
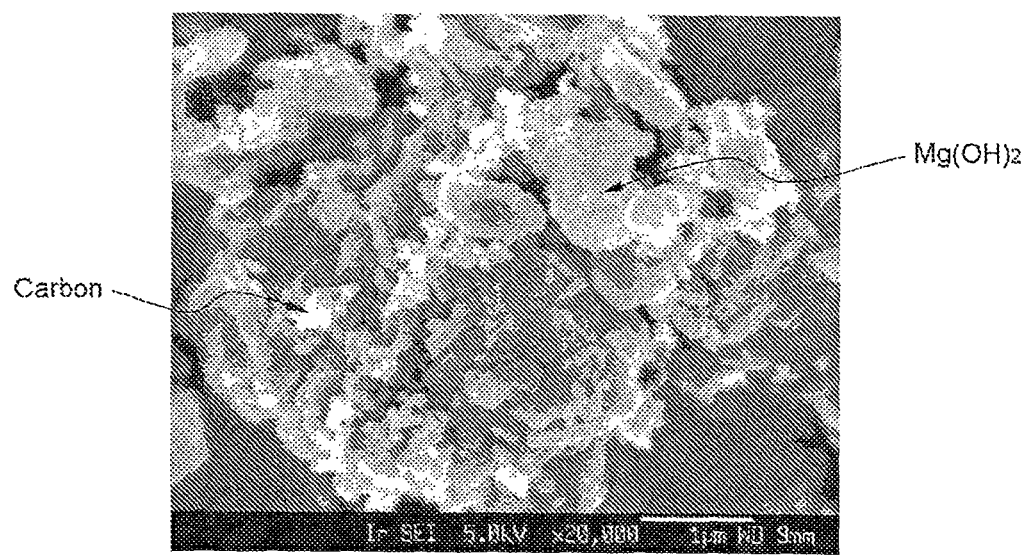
FIG. 2 is a micrograph showing carbon-coated $Mg(OH)_2$ particles in accordance with the present invention.

The extent that core particles are coated by the coating material may vary depending on the amount of the coating material added. Core particles need not necessarily be completely coated by the coating material to effect desired effects of the present invention. FIG. 1 schematically shows a coating material-coated core particle. FIG. 2 is a micrograph showing carbon-coated $Mg(OH)_2$ particles. As can be seen from FIG. 2, carbon, which is coating material, uniformly surrounded core particles.

In accordance with the present invention, there is provided an electrode fabricated by adding the thus-prepared electrode additive of the present invention to an electrode material including electrode active material so as to prepare an electrode slurry and coating a current collector with the thus-prepared electrode slurry. There is no limit to a method for fabricating an electrode, and well-known conventional methods in the art may be employed.

Preferably, the electrode additive may be included in the range of 0.05 to 10% by weight in the electrode, relative to the electrode active material.

Further, in accordance with the present invention, there is provided a lithium secondary battery comprising the above-prepared electrode. The lithium secondary battery of the present invention may be prepared by conventional methods known in the art, for example disposing a porous separator between the cathode and anode, followed by introduction of a non-aqueous electrolyte.

There is no limit to shapes of the lithium secondary battery in accordance with the present invention, and for example, mention may be made of can-shaped cylinders, squares or pouches.

As cathode active materials that can be used in fabricating the electrode of the present invention, lithium-containing transition metal oxides may be preferably used. For example, the cathode active material may be at least one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0 \leq Y < 1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<Z<2$), $LiCoPO_4$ and $LiFePO_4$. Among those materials, more preferred is $LiCoO_2$.

As anode active materials that can be used in fabricating the electrode of the present invention, mention may be made of graphite, carbon, lithium metals, alloys and complexes thereof, which are capable of occluding and releasing lithium ions.

In addition, in preparing the battery in accordance with the present invention, the porous separator may be preferably used as the separator. For example, the separator may include, but is not limited to, polypropylene-based, polyethylene-based, and other polyolefin-based porous separators.

The non-aqueous electrolyte of the lithium secondary battery that can be utilized in the present invention may contain cyclic carbonates and linear carbonates. The cyclic carbonates include, for example ethylene carbonate (EC), propylene carbonate (PC) and gamma-butyro lactone (GBL). The linear carbonate may be at least one selected from the group consisting of diethylcarbonate (DEC), dimethylcarbonate (DMC), ethylmethylcarbonate (EMC) and methylpropylcarbonate (MPC). Further, the non-aqueous electrolyte of the lithium secondary battery in accordance with the present invention may contain lithium salts, in addition to carbonate compounds. As specific examples, preferably, lithium salts may be selected from the group consisting of $LiClO_4$, $LiCF_3SO_3$, $LiPF_6$, $LiBF_4$, $LiAsF_6$ and $LiN(CF_3SO_2)_2$.

EXAMPLES

Now, the present invention will be described in more detail with reference to the following Examples and Comparative Examples. These examples are provided only for illustrating the present invention and should not be construed as limiting the scope and spirit of the present invention.

Example 1

1.1. Preparation of Electrode Additive

Acetylene black, which is a carbon material, as a coating material and $Mg(OH)_2$, which is a metal hydroxide, as a core particle, were used to prepare an electrode additive. The content of acetylene black was 5% by weight, relative to that of the core particle, $Mg(OH)_2$. A mixture of acetylene black and $Mg(OH)_2$ was loaded on a mechanofusion apparatus, and subjected to low speed rotation at 250 rpm for 3 min and subsequently to high speed rotation at 1400 rpm for 20 min so as to coat carbon on the surface of the metal hydroxide, thereby preparing the electrode additive ($C_{0.05}Mg(OH)_2$).

1.2. Preparation of Cathode $LiCoO_2$ was used as a cathode active material, and 0.5% by weight of the above-prepared electrode additive ($C_{0.05}Mg(OH)_2$) was added thereto, relative to the cathode active material. Then, together with 2.5% Super-P(conductive material) and 2.5% polyvinylidene difluoride (PVdF) as a binding agent, a cathode active material powder ($LiCoO_2$) and the electrode additive were dispersed in an n-methylpyrolidone (NMP) solvent to obtain a slurry. The slurry thus obtained was coated on aluminum foil and heated to evaporate the NMP solvent to dryness, followed by compression at a pressure of about 500 kg/cm$^2$ to prepare a cathode.

1.3. Preparation of Anode

Artificial graphite was used as an anode active material, and was dispersed, together with 0.8% acetylene black (conductive material), 3.9% PVdF as a binding agent and 0.2% oxalic acid, relative to the anode active material, in an NMP solvent to obtain slurry. The slurry thus obtained was coated on copper foil and heated to evaporate the NMP solvent to dryness, followed by compression at a pressure of about 500 kg/cm$^2$ to prepare an anode.

1.4. Battery Preparation and Evaluation

A conventional pouch-type bicell was prepared using the above-prepared cathode and anode, and as an electrolyte, a solution in which 1M $LiPF_6$ was dissolved in a 1:2 (v/v) mixed solvent of ethylene carbonate (EC) and ethyl methyl carbonate (EMC).

For the above-prepared battery, voltage of charge and discharge was established in the range of 3.0 to 4.2 V. Evaluation of battery life characteristics was made by 1 C/1 C charge/discharge. Evaluation of high rate discharge characteristics was carried out by charging the battery to 0.5 C, followed by measurement of capacity of 0.2 C, 0.5 C, 1 C, 1.5 C and 2 C and calculation of percentage of respective capacity thus measured, relative to capacity of 0.2 C. In addition, in order to evaluate high temperature storage characteristics, the battery was charged/discharged to 0.5 C/0.5 C two times and then charged to 0.2 C. This was followed by placement of the battery in an oven at 80° C. and determination of thickness changes with respect to the passage of time.

Example 2

An electrode and a battery were prepared and evaluated using the same procedure as in Example 1, except that 10% by weight of acetylene black as a coating material was added, relative to core particles, when preparing an electrode additive.

Example 3

An electrode and a battery were prepared and evaluated using the same procedure as in Example 1, except that, relative to an anode active material, there was added 1.0% by weight of an electrode additive, which was prepared in a manner that an electrode additive was not added to a cathode and 10% by weight of acetylene black as a coating material was added to an anode, relative to core particles ($Mg(OH)_2$).

Example 4

An electrode and a battery were prepared and evaluated using the same procedure as in Example 1, except that 10% by weight of acetylene black as a coating material was added, relative to core particles and $LiMn_2O_4$ powder was used as a cathode active material, when preparing an electrode additive.

Example 5

An electrode and a battery were prepared and evaluated using the same procedure as in Example 1, except that 10% by weight of acetylene black as a coating material was added, relative to core particles and $LiNi_{1/3}Mn_{1/3}Co_{1/3}O_2$ powder was used as a cathode active material, when preparing an electrode additive.

Example 6

An electrode and a battery were prepared and evaluated using the same procedure as in Example 1, except that 10% by weight of acetylene black as a coating material was added, relative to core particles and $BaCO_3$ was used as core particles, when preparing an electrode additive.

Example 7

An electrode and a battery were prepared and evaluated using the same procedure as in Example 1, except that 10% by weight of acetylene black as a coating material was added, relative to core particles and MgO was used as core particles, when preparing an electrode additive.

Example 8

An electrode and a battery were prepared and evaluated using the same procedure as in Example 1, except that 10% by weight of acetylene black as a coating material was added, relative to core particles and $Al_2O_3$ was used as core particles, when preparing an electrode additive.

Example 9

An electrode and a battery were prepared and evaluated using the same procedure as in Example 1, except that 10% by weight of acetylene black as a coating material was added, relative to core particles and $Y(OH)_3$ was used as core particles, when preparing an electrode additive.

Example 10

An electrode and a battery were prepared and evaluated using the same procedure as in Example 1, except that 10% by weight of acetylene black as a coating material was added, relative to core particles and $Al(OH)_3$ was used as core particles, when preparing an electrode additive.

Example 11

An electrode and a battery were prepared and evaluated using the same procedure as in Example 1, except that Ag metal powder was used as a coating material and 10% by weight of the coating material was added, relative to core particles, when preparing an electrode additive.

Example 12

An electrode and a battery were prepared and evaluated using the same procedure as in Example 1, except that Al metal powder was used as a coating material and the coating material was added in an amount of 10% by weight, relative to core particles, when preparing an electrode additive.

Example 13

An electrode and a battery were prepared and evaluated using the same procedure as in Example 1, except that $TiB_2$ powder was used as a coating material and the coating material was added in an amount of 10% by weight, relative to core particles, when preparing an electrode additive.

Example 14

An electrode and a battery were prepared and evaluated using the same procedure as in Example 1, except that a conductive polymer, polypyrrole powder was used as a coating material and the coating material was added in an amount of 10% by weight, relative to core particles, when preparing an electrode additive.

Example 15

An electrode and a battery were prepared and evaluated using the same procedure as in Example 1, except that a coating material was added in an amount of 10% by weight, relative to core particles, when preparing an electrode additive, and an electrode additive was added in an amount of 10% by weight, relative to a cathode active material, when preparing an electrode.

Example 16

An electrode and a battery were prepared and evaluated using the same procedure as in Example 1, except that a coating material was added in an amount of 10% by weight, relative to core particles, and an electrode additive was added to a cathode and anode, in amounts of 1% by weight and 2% by weight, respectively, relative to a cathode active material and an anode active material, when preparing an electrode additive.

Example 17

An electrode and a battery were prepared and evaluated using the same procedure as in Example 3, except that metal Si was used as an anode active material.

Example 18

An electrode and a battery were prepared and evaluated using the same procedure as in Example 3, except that Al metal powder was used as a coating material, the coating material was added in an amount of 10% by weight, relative to core particles and metal Si was used as an anode active material, when preparing an electrode additive.

Comparative Example 1

An electrode and a battery were prepared and evaluated using the same procedure as in Example 1, except that an electrode additive was not used Comparative Example 2

An electrode and a battery were prepared and evaluated using the same procedure as in Example 1, except that pure $Mg(OH)_2$ was added as a cathode additive.

Comparative Example 3

An electrode and a battery were prepared and evaluated using the same procedure as in Example 3, except that pure $Mg(OH)_2$ was added as an anode additive.

Figure 3:
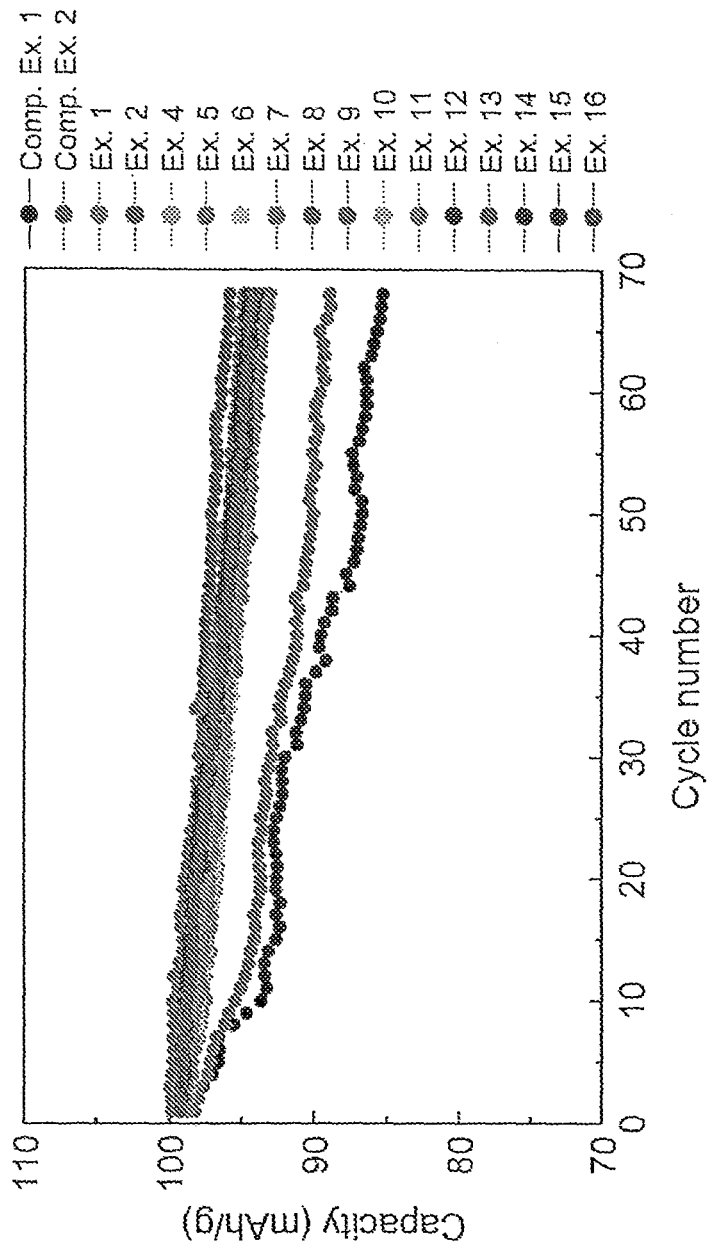
FIG. 3 graphically shows battery life characteristics, i.e. changes in cell capacity with respect to charge/discharge cycles, for bicells in which the electrode additive of the present invention is added to cathodes thereof (Examples) and bicells in which the electrode additive of the present invention is not added to cathodes thereof (Comparative Examples)
Figure 4:
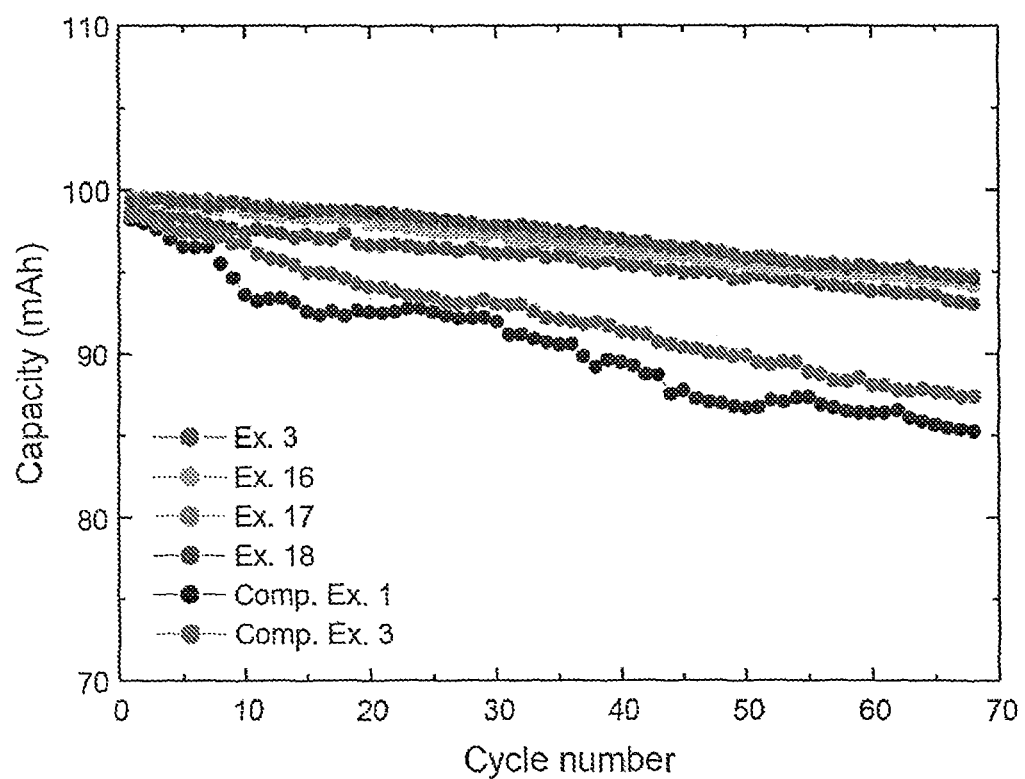
FIG. 4 graphically shows battery life characteristics, i.e. changes in cell capacity with respect to charge/discharge cycles, for bicells in which the electrode additive of the present invention is added to anodes thereof (Examples) and bicells in which the electrode additive of the present invention is not added to anodes thereof (Comparative Examples).

Evaluation results of batteries prepared in Examples 1 through 18 and Comparative Examples 1 through 3 are shown in FIGS. 3 and 4, and Tables 1 through 3.

TABLE 1

Changes in thickness of bicell, with or without addition of electrode additive to cathode, and with time

|  | Comp. Ex. 1 | Comp. Ex. 2 | Ex. 1 | Ex. 2 | Ex. 4 | Ex. 5 | Ex. 6 | Ex. 7 | Ex. 8 |
|---|---|---|---|---|---|---|---|---|---|
| 1 day | 3.08 | 3.09 | 3.10 | 3.08 | 3.09 | 3.08 | 3.10 | 3.09 | 3.08 |
| 3 days | 3.20 | 3.24 | 3.11 | 3.08 | 3.10 | 3.11 | 3.13 | 3.12 | 3.09 |
| 5 days | 3.42 | 3.42 | 3.15 | 3.15 | 3.16 | 3.17 | 3.19 | 3.18 | 3.11 |
| 7 days | 3.91 | 3.62 | 3.31 | 3.31 | 3.37 | 3.35 | 3.33 | 3.37 | 3.35 |
| 9 days | 4.43 | 3.97 | 3.48 | 3.44 | 3.43 | 3.46 | 3.49 | 3.48 | 3.45 |
| 11 days | 4.87 | 4.31 | 3.57 | 3.52 | 3.61 | 3.57 | 3.58 | 3.60 | 3.56 |

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| 1 day | 3.09 | 3.10 | 3.10 | 3.09 | 3.09 | 3.09 | 3.10 | 3.10 |
| 3 days | 3.11 | 3.10 | 3.12 | 3.11 | 3.12 | 3.13 | 3.13 | 3.14 |
| 5 days | 3.15 | 3.17 | 3.30 | 3.31 | 3.18 | 3.20 | 3.17 | 3.19 |
| 7 days | 3.32 | 3.35 | 3.39 | 3.38 | 3.39 | 3.38 | 3.32 | 3.37 |
| 9 days | 3.44 | 3.49 | 3.49 | 3.48 | 3.51 | 3.52 | 3.50 | 3.42 |
| 11 days | 3.59 | 3.55 | 3.54 | 3.59 | 3.58 | 3.59 | 3.59 | 3.64 |

As can be seen from Table 1, batteries prepared in Examples 1, 2 and 4 through 16 exhibited less changes in thickness under high temperature storage, compared to batteries prepared in Comparative Examples 1 and 2.

TABLE 2

Changes in thickness of bicell, with or without addition of electrode additive to anode, and with time

|  | Comp. Ex. 1 | Comp. Ex. 3 | Ex. 3 | Ex. 16 | Ex. 17 | Ex. 18 |
|---|---|---|---|---|---|---|
| 1 day | 3.08 | 3.09 | 3.10 | 3.10 | 3.11 | 3.10 |
| 3 days | 3.20 | 3.26 | 3.12 | 3.14 | 3.19 | 3.18 |
| 5 days | 3.42 | 3.41 | 3.16 | 3.19 | 3.21 | 3.32 |
| 7 days | 3.91 | 3.87 | 3.38 | 3.37 | 3.45 | 3.50 |
| 9 days | 4.43 | 4.11 | 3.42 | 3.42 | 3.55 | 3.56 |
| 11 days | 4.87 | 4.22 | 3.57 | 3.64 | 3.66 | 3.2 |

As can be seen from Table 2, batteries prepared in Examples 3, 16, 17 and 18 exhibited less changes in thickness under high temperature storage, compared to batteries prepared in Comparative Examples 1 and 3.

TABLE 3

Changes in battery capacity with respect to discharge rate

| Discharge rate (C) | Comp. Ex. 1 | Comp. Ex. 2 | Comp. Ex. 3 | Ex. 1 | Ex. 2 | Ex. 3 | Ex. 4 |
|---|---|---|---|---|---|---|---|
| 0.2 | 100 | 100 | 100 | 100 | 100 | 100 | 100 |
| 0.5 | 99.61 | 99.61 | 99.45 | 99.64 | 99.51 | 99.88 | 99.78 |
| 1 | 99.36 | 99.38 | 99.29 | 99.52 | 99.40 | 99.62 | 99.63 |
| 1.5 | 99.86 | 99.85 | 99.75 | 99.89 | 94.92 | 99.61 | 99.67 |
| 2 | 99.56 | 99.78 | 99.58 | 99.87 | 99.06 | 99.41 | 99.78 |

|  | Ex. 5 | Ex. 6 | Ex. 7 | Ex. 8 | Ex. 9 | Ex. 10 | Ex. 11 |
|---|---|---|---|---|---|---|---|
| 0.2 | 100 | 100 | 100 | 100 | 100 | 100 | 100 |
| 0.5 | 99.51 | 99.71 | 99.44 | 99.58 | 99.51 | 99.47 | 99.46 |
| 1 | 99.42 | 99.48 | 99.35 | 99.32 | 99.34 | 99.35 | 99.31 |
| 1.5 | 99.66 | 99.55 | 99.54 | 99.77 | 99.76 | 99.71 | 99.75 |
| 2 | 99.56 | 99.48 | 99.52 | 99.59 | 99.54 | 99.50 | 99.56 |

TABLE 3-continued

Changes in battery capacity with respect to discharge rate

|  | Ex. 12 | Ex. 13 | Ex. 14 | Ex. 15 | Ex. 16 | Ex. 17 | Ex. 18 |
| --- | --- | --- | --- | --- | --- | --- | --- |
| 0.2 | 100 | 100 | 100 | 100 | 100 | 100 | 100 |
| 0.5 | 99.54 | 99.53 | 99.88 | 99.81 | 99.53 | 99.71 | 99.49 |
| 1 | 99.50 | 99.47 | 99.65 | 99.73 | 99.52 | 99.58 | 99.32 |
| 1.5 | 99.81 | 94.82 | 99.71 | 99.70 | 99.65 | 99.65 | 99.69 |
| 2 | 99.86 | 99.36 | 99.49 | 99.78 | 99.66 | 99.58 | 99.48 |

As can be seen from Table 3, batteries prepared in Examples 1 through 18, to which the electrode additive in accordance with the present invention was added, exhibited relatively little drop in high rate discharge, compared to batteries of Comparative Examples 1 through 3.

Further, as shown in FIGS. 3 and 4, batteries prepared in Examples 1 through 18 exhibited relatively less changes in battery capacity with respect to charge/discharge cycles, compared to batteries prepared in Comparative Examples 1 through 3.

INDUSTRIAL APPLICABILITY

As described above, the electrode additive in accordance with the present invention, when introduced to a cathode and/or anode of a lithium secondary battery, can exert characteristics intrinsic to the additive such as improvement of high temperature storage characteristics, without deteriorating battery performance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electrode comprising an electrode active material, an electrode additive, and a carbon-based conductive material,
   wherein the electrode additive has a core particle coated with a coating material on the surface of the core particle,
   wherein the coating material is electro-conductive,
   wherein the coating material and the electrode active material are different materials,
   wherein the electrode additive is present in an amount in the range of 0.05 to 10% by weight, relative to the electrode active material,
   wherein the electrode additive is present in an amount less than an amount of the carbon-based conductive material,
   wherein the coating material is composed of one or more materials selected from the group consisting of carbon, an electro-conductive metal, an electro-conductive inorganic material and an electro-conductive polymer, and
   wherein the electro-conductive metal is selected from the group consisting of Cu, Ag, Pt and Ni, the electro-conductive inorganic material is selected from the group consisting of zinc oxide (ZnO), ruthenium oxide ($RuO_2$) and $TiB_2$, and the electro-conductive polymer is selected from the group consisting of polypyrrole and polyaniline.

2. An electrode comprising an electrode active material, an electrode additive, and a carbon-based conductive material,
   wherein the electrode additive has a core particle coated with a coating material on the surface of the core particle,
   wherein the coating material is electro-conductive,
   wherein the electrode additive is present in an amount in the range of 0.05 to 10% by weight, relative to the electrode active material,
   wherein the electrode additive is present in an amount less than an amount of the carbon-based conductive material,
   wherein the coating material is composed of one or more materials selected from the group consisting of carbon, an electro-conductive metal, an electro-conductive inorganic material and an electro-conductive polymer, and
   wherein the electro-conductive metal is selected from the group consisting of Cu, Ag, Pt and Ni, the electro-conductive inorganic material is selected from the group consisting of zinc oxide (ZnO), ruthenium oxide ($RuO_2$) and $TiB_2$, and the electro-conductive polymer is selected from the group consisting of polypyrrole and polyaniline.

3. The electrode according to claim 2, wherein the core particle is a material of Formula 1 that is added to battery electrodes for improving high temperature storage characteristics:

$$M_xA_y \qquad (1)$$

wherein, M is a metal, A is selected from the group consisting of OH, O and $CO_3$, and x is 1 or 2 and y is 1, 2, or 3.

4. The electrode according to claim 3, wherein M in Formula 1 is one or more elements selected from the group consisting of Al, B, Mg, K, Be, Ca, Sr, Ba, Na, Cr, Sn, Ga, Bi, Ni, Co, Fe, Cr, Y and Zr.

5. The electrode according to claim 2, wherein the coating material has an electrical conductivity of more than $2.0 \times 10^2$/cm$\Omega$.

6. The electrode according to claim 2, wherein the coating material has a particle size of 10 nm to 1000 nm.

7. The electrode according to claim 2, wherein the amount of the coating material is within the range of 0.01 to 20% by weight, relative to the core particle.

8. A lithium secondary battery comprising the electrode of claim 2.

9. The electrode according to claim 2, wherein the electrode active material is a cathode active material, anode active material, or both a cathode active material and an anode active material.

10. The electrode according to claim 2, wherein the electrode active material is a cathode active material.

11. An electrode comprising a cathode active material, an electrode additive, and a carbon-based conductive material,
    wherein the electrode additive has a core particle coated with a coating material on the surface of the core particle,
    wherein the coating material is electro-conductive,
    wherein the electrode additive is present in an amount less than an amount of the carbon-based conductive material,
    wherein the coating material is composed of one or more materials selected from the group consisting of carbon, an electro-conductive metal, an electro-conductive inorganic material and an electro-conductive polymer, and wherein the electro-conductive metal is selected from the group consisting of Cu, Ag, Pt and Ni, the electro-conductive inorganic material is selected from the group consisting of zinc oxide (ZnO), ruthenium oxide ($RuO_2$) and $TiB_2$, and the electro-conductive polymer is selected from the group consisting of polypyrrole and polyaniline.

* * * * *